Sept. 16, 1969     E. L. MACOICZ     3,467,814
ELECTRIC WATER HEATER CIRCUIT MEANS
Filed Feb. 26, 1968
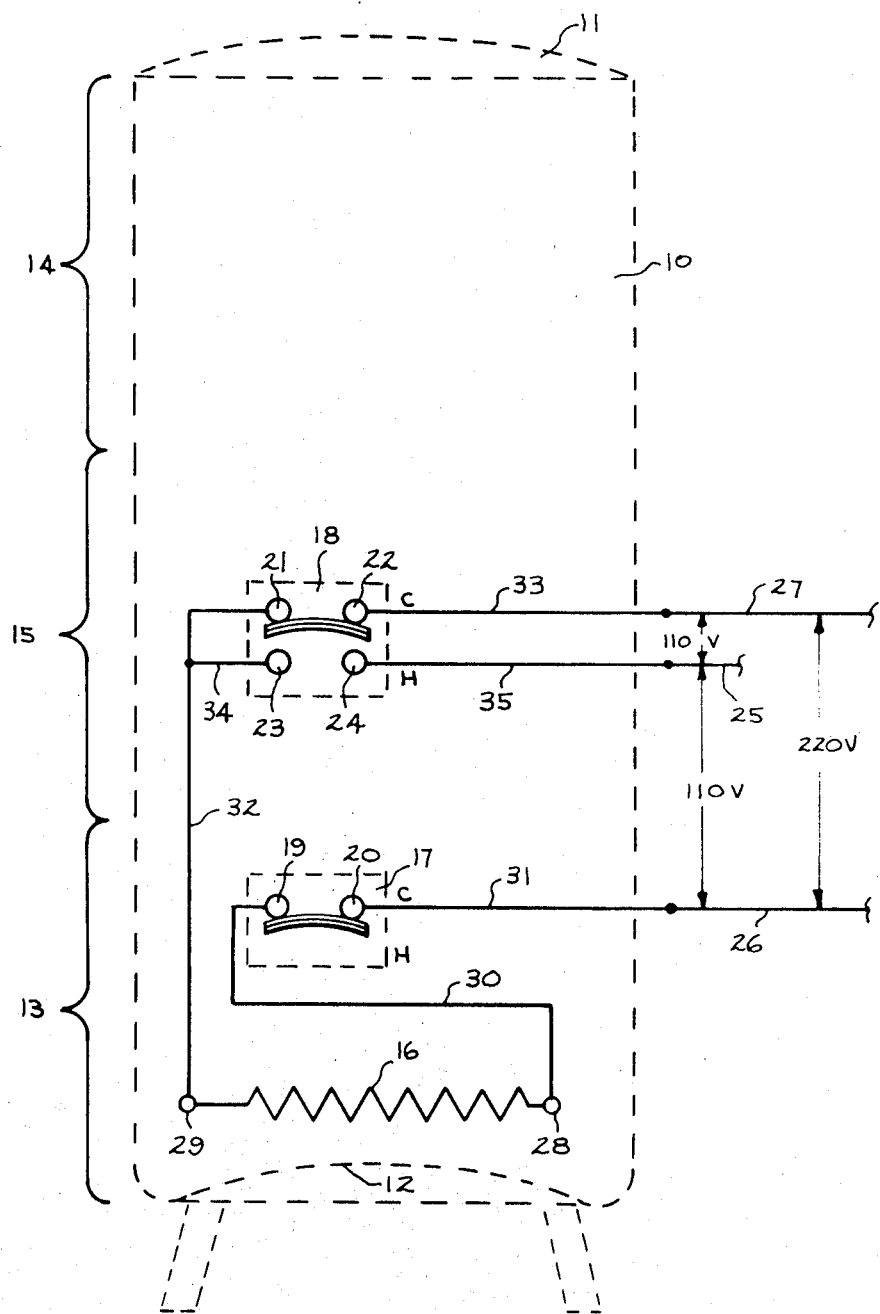
INVENTOR.
EDWARD L. MACOICZ
BY
HIS ATTORNEY

United States Patent Office 3,467,814
Patented Sept. 16, 1969

3,467,814
ELECTRIC WATER HEATER CIRCUIT MEANS
Edward L. Macoicz, Glendale, Wis., assignor to General
Electric Company, a corporation of New York
Filed Feb. 26, 1968, Ser. No. 708,181
Int. Cl. H05b 1/00, 3/02
U.S. Cl. 219—330                                    6 Claims

ABSTRACT OF THE DISCLOSURE

Electric heater circuit means for water tank having a lower water inlet portion, an upper water outlet portion and an intermediate portion. The circuit means comprise electrical resistance heating means located in the tank lower portion and thermally responsive switch means including a pair of switches that are responsive to water temperatures in the tank lower and intermediate portions, respectively. The electrical heating means is connected through the switches to a power supply which includes a neutral line and two outer lines. The circuit arrangement is made such that the heating means can be automatically energized at either of two different voltages or de-energized by the thermally responsive operation of the switches.

BACKGROUND OF THE INVENTION

Simpler forms of electric hot water heaters often comprise a generally vertically-arranged cylindrical tank having electrical resistance heating means within only its lower portion. The heating means is usually connected to a two wire power supply through a thermally responsive switch that is responsive to water temperature in the tank lower portion. Incoming cold water is admitted at the tank lower portion and hot water is drawn-off from the tank upper portion. As hot water is drawn-off, a like amount of cold water is admitted, and the switch automatically energizes the heating means at its full heating capacity until the incoming cold water is heated to the desired "hot" temperature.

In normal usage of such water heaters, generally only small amounts of hot water are drawn off and a larger draw-off is only an occasional occurrence. While it is obviously necessary to provide heating means that are capable of rapidly recovering the heat lost by a larger draw-off it is desirable that the full capacity of the heating means be employed only when necessary to avoid undue wear thereof. It is also desirable that the operation of the heating means during both small and larger draw-offs be automatic and that the control components employed to provide such automatic operation be of the type which can be economically provided and maintained.

SUMMARY OF THE INVENTION

The present invention provides improved electric heater circuit means for a water tank having a lower water inlet portion, an upper water outlet portion and an intermediate portion, and having electrical resistance heating means within the tank lower portion. The heating means is connected to a power supply, which includes a neutral line and two outer lines, through thermally responsive switch means that are responsive to water temperatures in the tank lower and intermediate portions to energize the heating means at either of two different voltages (and consequently two different power levels) or to de-energize the heating means.

In one presently preferred form of the present invention, the switch means comprise a single-throw type switch that is responsive to water temperature in the tank lower portion and a double-throw type switch that is responsive to water temperature in the tank intermediate portion. Both of the switches operate at an approximately identical predetermined temperature. The circuit is arranged such that, when a normal small draw-off occurs and the incoming water rises to an elevation no higher than the tank lower portion, the switches operate to connect the heating means across the neutral line and one of the outer lines, whereby the heating means is energized at only one-quarter of its full heating capacity. However, when a larger draw-off occurs and the incoming water rises to an elevation within the tank intermediate portion, the switches operate to connect the heating means across the two outer lines, whereby the heating means is energized at its full heating capacity. Furthermore, when draw-off is completed and the water in both tank lower and intermediate portions is heated above the predetermined temperature, the switches operate to disconnect the heating means from across the power supply lines.

BRIEF DESCRIPTION OF THE DRAWING

The present invention is illustrated in the accompanying drawing wherein the figure of the drawing is a circuit diagram of the arrangement of the circuit means of the present invention for energizing the heating means of an electric water heater and shows the physical location of the circuit components with respect to water tank.

DESCRIPTION OF THE PREFERRED EMBODIMENT

Referring now to the figure of the drawing, there is illustrated a generally vertically-arranged cylindrical water heater tank 10 having a domed top 11 and a concave bottom 12. The tank is divided into three portions including a lower portion 13 having a water inlet (not shown), an upper portion 14 having a water outlet (not show) and an intermediate portion 15. Heating means are provided which comprise only a single heating element 16 located in the tank lower portion 13. The heating element 16 is typically a sheathed waterproof electrical resistance heating element placed within the tank 10 with its electrical connections extending through sealed apertures (not shown) in the tank wall. Thermally responsive switch means are provided which include two thermally responsive electric switches 17 and 18. A first of the two switches 17 is responsive to water temperature in the tank lower portion 13 and is of a single-throw type having a pair of normally closed contacts 19 and 20. A second of the two switches 18 is responsive to water temperature in the tank intermediate portion 15 and is of a double-throw type having a pair of normally closed contacts 21 and 22 and a pair of normally open contacts 23 and 24. One convenient location for the thermally responsive switches 17 and 18 is on the outer wall of the tank 10 in a heat transfer relationship with respect to the wall so as to be responsive to the temperature of water within the tank.

The electrical heating element 16 is energized through the two thermally responsive switches 17 and 18 from a power supply system which includes a neutral line 25 and first and second outer lines 26 and 27. A typical line voltage provided between the two outer lines 26 and 27 is 220 volts, and a typical line voltage provided between a neutral line 25 and either of the two outer lines 26 or 27 is 110 volts, is shown in the right hand portion of the figure.

The heating element 16 has first and second terminals 28 and 29, respectively, at its opposite ends. The first terminal 28 of the heating element 16 is connected to one of the normally closed contacts 19 of the first switch 17 by a conductor 30. The other normally closed contact 20 of the first switch 17 is connected to the first outer line 26 of the power supply by a conductor 31. Thus, the heating element 16 and the first switch 17 can be connected in electrical series to the first outer line 26 of the power supply, when the contacts 19 and 20 of the first switch 17 are closed.

The second terminal 29 of the heating element 16 is connected to one of the normally closed contacts 21 of the second switch 18 by a conductor 32. The other normally closed contact 22 of the second switch 18 is connected to the second outer line 27 by a conductor 33. Thus, the first switch 17 and the heating element 16 can be connected in electrical series to the second outer line 27 of the power supply when the normally closed contacts 21 and 22 of the second switch 18 are closed.

One of the normally open contacts 23 of the second switch 18 is connected to the conductor 32 by a conductor 34 and the other normally open contact 24 of the second switch 18 is connected to the neutral line 25 by a conductor 35. Thus, the first switch 17 and the heating element 16 can be connected in electrical series to the neutral line 25 of the power supply when the normally open contacts 23 and 24 of the second switch 18 are closed.

The operation of the form of the circuit means of the present invention illustrated in the figure will now be described assuming that the tank 10 has been filled with cold water. In such a condition, both of the thermally responsive switches 17 and 18 will move to the positions indicated by the letters C in the figure. The letters C indicate the normal first or cold positions of the thermally responsive switches 17 and 18. That is, the normally closed contacts 19 and 20 of the first switch 17 and 21 and 22 of the second switch 18 will be closed and the normally open contacts 23 and 24 of the second switch 18 will be open. With both of the switches 17 and 18 thus in their normal or cold positions, indicated by the letters C, the heating element 16 is connected across the outer lines 26 and 27 of the power supply through a first circuit which comprises the conductor 31, the closed contacts 19 and 20 of the first switch 17, the conductor 30, the heating element 16, the conductor 32, the closed contacts 21 and 22 of the second switch 18 and the conductor 33.

The thermally responsive switches 17 and 18 are adjusted to move from their normal first or cold positions, indicated by the letters C, to their actuated second or hot positions, indicated by the letters H, at approximately the same predetermined water temperature. Since the natural convection of the water carries the warmer water upwardly within the tank 10, the water temperature in the tank intermediate portion 15 will reach the predetermined temperature before the water in the tank lower portion 13. When the water in the tank intermediate portion 15 reaches the predetermined temperature, the second switch 18 will move to its hot or second position indicated by the letter H. In this condition, the normally closed contacts 21 and 22 of the second switch 18 will be opened and the normally open contacts 23 and 24 of the second switch 18 will be closed. However, since the water temperature in the tank lower portion 13 is still below the predetermined temperature, the contacts 19 and 20 of the first switch 17 will remain closed and the heating element 16 will remain energized, being connected across the neutral line 25 and the first outer line 26 of the power supply through a second circuit which comprises the conductor 31, the closed contacts 19 and 20 of the first switch 17, the heating element 16, the conductor 32 and 34, the now closed normally open contacts 23 and 24 of the second switch 18 and the conductor 35.

The heating element 16 will remain energized across the neutral line 25 and the first outer line 26 until the water in the tank lower portion 13 is heated to the predetermined temperature, whereupon first switch 17 will move from its normally closed or cold position, indicated by the letter C, to its actuated or hot position indicated by the letter H, opening its contacts 19 and 20 to open the second circuit and de-energize the heating element 16. Thus, when both the tank lower and intermediate portions 13 and 15 are filled with water heated above the predetermined temperature, both of the thermally responsive switches 17 and 18 will be in their actuated or hot positions indicated by the letters H. Then, there will be no connection of the heating element 16 across any of the power lines 25–27 and the heating element 16 will, of course, be de-energized.

During draw-off of hot water from the tank upper portion 14 through the outlet (not shown), cold water enters the tank lower portion 13 through the inlet (not shown). Therefore, during draw-off, the first switch 17 is the first to return to its normal or closed position as indicated by the letter C. This re-closes its contacts 19 and 20 and re-closes the second circuit connecting the heating element 16 across the neutral line 25 and the first outer line 26 of the power supply and, thus, re-energizes the heating element at the lower of the two available voltages. If the draw-off is a normal small one, the incoming cold water will not rise to an elevation above the tank lower portion 13.

However, a larger draw-off of hot water from the tank 10 at a rate greater than the heat recovery provided by a lower-voltage, second-circuit energized heating element 16 will cause the incoming cold water to rise to an elevation within the tank intermediate portion 15, thus causing the temperature therein to drop below the predetermined temperature. Such a drop in temperature in the tank intermediate portion 15 will cause the second switch 18 to also return to its normal first or cold position, as indicated by the letter C. When this occurs, the normally open contacts 23 and 24 of the second switch 18 will be re-opened and will open the second circuit. However, the normally closed contacts 21 and 22 of the second switch 18 will be concurrently re-closed, thereby re-closing the first circuit, and, thus, connecting the heating element 16 across the two outer lines 26 and 27 and re-energizing the heating element at the higher of the two available voltages to provide maximum available heat recovery. Thus, the circuit arrangement of the present invention provides two levels of heat recovery in an electric water heater provided with only a single electrical resistance heating element that is disposed within the tank lower portion 13.

Typically the tank 10 has a rated capacity of 50 gallons of water, and the heating element 16 is rated to provide 6,000 watts when energized at 220 volts. Therefore, for normal small draw-offs of hot water when the incoming cold water does not rise to an elevation above the tank lower portion 13, the heating element is connected across only 110 volts and the heat recovery energy is provided at the lower heat recovery rate of 1,500 watts. With a larger draw-off at a rate greater than the lower heat recovery rate provided the 1,500 watts, where the incoming cold water rises to an elevation in the tank intermediate portion 15, the heating element 16 is connected across 220 volts and heat recovery energy is provided at the higher rate of 6,000 watts.

The circuit means of the present invention also mitigate wearing of the heating element 16 and the switches 17 and 18 since, in normal use, the bulk of their operation will be at the small draw-off, lower heat recovery rate, wherein the heating element 16 is connected across the neutral line 25 and the first outer line 26 at the lower of the two available voltages. Hence, the current carried by the heating element 16 and the switches 17 and 18 is usually only one-half that carried by them during the occasional periods of larger draw-off, higher heat recovery rate operation.

As will be evident from the foregoing description, certain aspects of the present invention are not limited to the particular details of construction of the examples illustrated, and it is contemplated that various other modifications and applications would occur to those skilled in the art. For example, the capacity of the heating element 16 obviously might be other than that specifically described above, as might the voltages available across the power supply lines 25–27. It is therefore intended that the ap-

What I claim as new and desire to secure by Letters Patent of the United States is:

1. In an electric water heater, an arrangement for energizing electrical resistance heating means from a power supply which includes a neutral line and first and second outer lines, comprising:
   (a) a water tank having a lower water inlet portion, an upper water outlet portion and an intermediate portion;
   (b) electrical resistance heating means disposed within said tank lower portion; and
   (c) thermally responsive circuit means
      (i) responsive when water temperatures in both said tank lower and intermediate portions are below an approximately identical predetermined temperature to connect said heating means across the outer lines,
      (ii) responsive when water temperature in said tank intermediate portion is above and water temperature in said tank lower portion is below said predetermined temperature to connect said heating means across one of the outer lines and the neutral line, and
      (iii) responsive when water temperatures in both said tank lower and intermediate portions are above said predetermined temperature to disconnect said heating means from across the lines.

2. The invention of claim 1, wherein said heating means within said tank lower portion comprise the only heating means provided within said tank.

3. The invention of claim 2, wherein said heating means within said tank lower portion comprises only a single electrical resistance heating element.

4. The invention of claim 1, wherein said thermally responsive circuit means includes:
   (a) a first thermally responsive switch responsive to water temperature in said tank lower portion and connected in series with said heating means to one of the outer lines,
   (b) said first switch being normally closed and opening in response to water temperature in said tank lower portion reaching said predetermined temperature; and
   (c) a second thermally responsive switch of a double-throw type responsive to water temperature in said tank intermediate portion and operable between
      (i) a first position connecting said first switch and said heating means in series to the other of the outer lines and
      (ii) a second position connecting said first switch and said heating means in series to the neutral line and disconnecting said heating means and first switch from the other of the outer lines;
   (d) said second switch being normally in said first position and being operable to move to said second position in response to water temperature in said tank intermediate portion reaching said predetermined temperature.

5. The invention of claim 4, wherein said heating means within said tank lower portion comprises the only heating means provided within said tank.

6. The invention of claim 5, wherein said heating means within said tank lower portion comprise only a single electrical resistance heating element.

References Cited
UNITED STATES PATENTS

| | | | |
|---|---|---|---|
| 3,352,999 | 11/1967 | Macoicz et al. | 219—330 X |
| 3,353,001 | 11/1967 | Macoicz et al. | 219—330 X |
| 3,353,002 | 11/1967 | Macoicz et al. | 219—330 X |

JOSEPH V. TRUHE, Primary Examiner

C. L. ALBRITTON, Assistant Examiner

U.S. Cl. X.R.

219—316, 331